United States Patent
Pakidko et al.

(10) Patent No.: US 10,356,239 B1
(45) Date of Patent: *Jul. 16, 2019

(54) TRANSCRIBING AUDIO COMMUNICATION SESSIONS

(71) Applicant: Sorenson IP Holdings, LLC, Salt Lake City, UT (US)

(72) Inventors: Nicholas N. Pakidko, Provo, UT (US); Jasper Pan, Draper, UT (US)

(73) Assignee: Sorenson IP Holdings, LLC, Salt Lake City, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/601,750

(22) Filed: May 22, 2017

Related U.S. Application Data (63) Continuation of application No. 15/342,969, filed on Nov. 3, 2016, now Pat. No. 9,674,341, which is a continuation of application No. 15/221,278, filed on Jul. 27, 2016, now Pat. No. 9,497,315.

(51) Int. Cl.
| | | |
|---|---|---|
| *H04M 3/22* | (2006.01) | |
| *H04W 4/80* | (2018.01) | |
| *G10L 15/26* | (2006.01) | |
| *H04W 88/06* | (2009.01) | |
| *H04W 84/12* | (2009.01) | |
| *H04W 76/10* | (2018.01) | |

(52) U.S. Cl.
CPC ............ *H04M 3/2281* (2013.01); *H04W 4/80* (2018.02); *G10L 15/265* (2013.01); *H04W 76/10* (2018.02); *H04W 84/12* (2013.01); *H04W 88/06* (2013.01)

(58) Field of Classification Search
CPC ..... H04W 4/008; H04W 76/02; H04W 84/12; H04W 88/06; H04L 29/08108; H04M 3/2281; G10L 15/265

USPC ........................................................ 455/414.1
See application file for complete search history.

(56) References Cited

U.S. PATENT DOCUMENTS

| | | | |
|---|---|---|---|
| 4,777,469 | A | 10/1988 | Engelke et al. |
| 4,959,847 | A | 9/1990 | Engelke et al. |
| 5,081,673 | A | 1/1992 | Engelke et al. |
| 5,325,417 | A | 6/1994 | Engelke et al. |
| 5,327,479 | A | 7/1994 | Engelke et al. |

(Continued)

FOREIGN PATENT DOCUMENTS

WO     2015008162 A2     1/2015

OTHER PUBLICATIONS

Debbie Clason, "The best apps for phone captioning", http://www.healthyhearing.com/report/47850-The-best-phone-captioning-apps-for-the-hearing-impaired, Feb. 9, 2012, 2 pages, retrieved on Jul. 27, 2016.

(Continued)

*Primary Examiner* — William Nealon
(74) *Attorney, Agent, or Firm* — Maschoff Brennan (57) ABSTRACT

A computer-implemented method to provide transcriptions of an audio communication session is disclosed. The method may include receiving audio data at a first device from a second device over a first wireless network connection of a first wireless network type and providing the audio data to a speaker of the first device for output of the audio data. The method may further include encoding the audio data at the first device based on a second wireless network type and transmitting the encoded audio data from the first device over a second wireless network of the second wireless network type.

20 Claims, 7 Drawing Sheets

(56) References Cited

U.S. PATENT DOCUMENTS

| | | | |
|---|---|---|---|
| 5,351,288 A | 9/1994 | Engelke et al. | |
| 5,432,837 A | 7/1995 | Engelke et al. | |
| D364,865 S | 12/1995 | Engelke et al. | |
| 5,581,593 A | 12/1996 | Engelke et al. | |
| 5,604,786 A | 2/1997 | Engelke et al. | |
| 5,687,222 A | 11/1997 | McLaughlin et al. | |
| 5,724,405 A | 3/1998 | Engelke et al. | |
| 5,809,425 A | 9/1998 | Colwell et al. | |
| 5,909,482 A * | 6/1999 | Engelke | G10L 15/26 379/52 |
| 5,974,116 A | 10/1999 | Engelke et al. | |
| 5,978,654 A | 11/1999 | Colwell et al. | |
| 6,075,842 A | 6/2000 | Engelke et al. | |
| 6,493,426 B2 | 12/2002 | Engelke et al. | |
| 6,504,910 B1 | 1/2003 | Engelke et al. | |
| 6,510,206 B2 | 1/2003 | Engelke et al. | |
| 6,594,346 B2 | 7/2003 | Engelke | |
| 6,603,835 B2 | 8/2003 | Engelke et al. | |
| 6,882,707 B2 | 4/2005 | Engelke et al. | |
| 6,885,731 B2 | 4/2005 | Engelke et al. | |
| 7,133,513 B1 * | 11/2006 | Zhang | H04M 3/42221 379/202.01 |
| 7,660,398 B2 | 2/2010 | Engelke et al. | |
| 7,881,441 B2 | 2/2011 | Engelke et al. | |
| 8,014,765 B2 * | 9/2011 | Pettinato | H04N 7/163 455/412.1 |
| 9,009,055 B1 * | 4/2015 | Jablokov | G06Q 30/0251 704/231 |
| 9,350,857 B1 | 5/2016 | Engelke et al. | |
| 9,380,150 B1 | 6/2016 | Bullough et al. | |
| 9,497,315 B1 * | 11/2016 | Pakidko | H04W 4/80 |
| 2002/0085690 A1 * | 7/2002 | Davidson | H04M 1/6505 379/88.17 |
| 2004/0064317 A1 * | 4/2004 | Othmer | G06Q 10/10 704/260 |
| 2004/0081295 A1 | 4/2004 | Brown et al. | |
| 2004/0267527 A1 | 12/2004 | Creamer et al. | |
| 2006/0193269 A1 * | 8/2006 | Perraud | H04M 1/6066 370/278 |
| 2006/0274704 A1 * | 12/2006 | Desai | H04W 72/1215 370/338 |
| 2008/0039966 A1 * | 2/2008 | Redgewell | H04L 65/4084 700/94 |
| 2009/0177470 A1 * | 7/2009 | Beach | G10L 15/30 704/235 |
| 2009/0292539 A1 | 11/2009 | Jaroker | |
| 2009/0299743 A1 * | 12/2009 | Rogers | H04M 1/274516 704/235 |
| 2009/0326939 A1 * | 12/2009 | Toner | H04M 1/656 704/235 |
| 2010/0158214 A1 * | 6/2010 | Gravino | H04M 3/53333 379/88.14 |
| 2010/0159830 A1 * | 6/2010 | Findlay | H04M 1/6066 455/41.2 |
| 2011/0296484 A1 * | 12/2011 | Harres | H04H 20/57 725/114 |
| 2012/0244811 A1 * | 9/2012 | Chen | H04L 12/1827 455/41.2 |
| 2012/0250836 A1 | 10/2012 | Engleke et al. | |
| 2012/0265529 A1 * | 10/2012 | Nachtrab | G06F 17/289 704/235 |
| 2013/0033435 A1 * | 2/2013 | Raveendran | G06F 3/0481 345/173 |
| 2013/0102288 A1 * | 4/2013 | Hussain | H04W 4/023 455/414.1 |
| 2013/0244705 A1 * | 9/2013 | Gould | H04M 3/42391 455/466 |
| 2013/0289971 A1 * | 10/2013 | Parkinson | G10L 15/26 704/2 |
| 2014/0024411 A1 | 1/2014 | Rao et al. | |
| 2014/0314220 A1 | 10/2014 | Charugundla | |
| 2014/0314261 A1 | 10/2014 | Selig et al. | |
| 2015/0032450 A1 | 1/2015 | Hussain et al. | |
| 2015/0094105 A1 | 4/2015 | Pan | |
| 2015/0181306 A1 | 6/2015 | Innes et al. | |
| 2015/0281456 A1 | 10/2015 | Doulton | |
| 2016/0037251 A1 | 2/2016 | Daniels | |
| 2016/0065509 A1 * | 3/2016 | Yang | H04L 51/22 715/752 |
| 2016/0105554 A1 | 4/2016 | Engelke et al. | |

OTHER PUBLICATIONS

"InnoCaption: Getting Started: About Getting Started", http://www.innocaption.com/faqs-about-getting-started/, 14 pages, retrieved on Jul. 27, 2016.

International Search Report and Written Opinion, as issued in connection with International Patent No. PCT/US17/42578, dated Oct. 31, 2017.

* cited by examiner

TRANSCRIBING AUDIO COMMUNICATION SESSIONS

CROSS-REFERENCE TO RELATED APPLICATION

This patent application is a continuation of U.S. patent application Ser. No. 15/342,969, filed Nov. 3, 2016, which is a continuation of U.S. patent application Ser. No. 15/221,278, filed Jul. 27, 2016, now U.S. Pat. No. 9,497,315, both of which are incorporated herein by reference.

FIELD

The embodiments discussed herein are related to transcribing audio communication sessions.

BACKGROUND

Modern telecommunication services provide features to assist those who are deaf or hearing-impaired. One such feature is a text captioned telephone system for the hearing impaired that uses a relay system. A relay system may be a telecommunication intermediary service that is intended to permit a hearing-impaired user to utilize a normal telephone network.

The subject matter claimed herein is not limited to embodiments that solve any disadvantages or that operate only in environments such as those described above. Rather, this background is only provided to illustrate one example technology area where some embodiments described herein may be practiced.

SUMMARY

A computer-implemented method to provide transcriptions of an audio communication session is disclosed. The method may include receiving audio data at a first device from a second device over a first wireless network connection of a first wireless network type and providing the audio data to a speaker of the first device for output of the audio data. The method may further include encoding the audio data at the first device based on a second wireless network type and transmitting the encoded audio data from the first device over a second wireless network of the second wireless network type.

BRIEF DESCRIPTION OF THE DRAWINGS

Example embodiments will be described and explained with additional specificity and detail through the use of the accompanying drawings in which.

DESCRIPTION OF EMBODIMENTS

Some embodiments in this disclosure relate to a method and/or system that may transcribe audio communication sessions. In some embodiments, a mobile device, for example a smart phone, may begin a communication session over a cellular network. A user of the mobile device may be hearing-impaired. As a result, the user may not be able to fully understand audio received during the communication session. The audio may be voice data generated by another device participating in the communication session. In these and other embodiments, the audio received over the cellular network communication session may be transferred to an audio output device over a second wireless network. For example, the audio output device may be a Bluetooth headset and the second wireless network may be a Bluetooth network.

The audio output device may be configured to multiplex the received audio. The multiplexed received audio may be sent to a speaker of the audio output device to be broadcast to the user. The multiplexed received audio may also be encoded for transmission over a third wireless network to a transcription system. In these and other embodiments, the transcription system may be configured to transcribe the audio and send a transcript of the audio to the mobile device for presentation to the user. The transcript may assist the user in understanding the audio and better participate in the communication session.

In some embodiments, the systems and/or methods described in this disclosure may help to enable the transcription of audio received at a mobile device or other devices during a communication session. In other settings, audio received at devices during a communication session of a cellular network may not be easily captured by an application running on the device. For example, the audio from a phone call on a cellular network using a smart phone or other cellular phone is typically isolated from third party applications that are executed by the smart phone. As a result, the audio from the phone call may not be easily, or in some circumstances may not be able to be, multiplexed and transferred to a transcription system to generate a transcript to assist the hearing impaired during the phone call. The systems and/or methods described in this disclosure may assist in enabling the capture and generation of a transcript of audio from a phone call on a cellular network using a cellular enabled device. Thus, the systems and/or methods provide at least a technical solution to a technical problem associated with the design of cellular enabled devices in the technology of telecommunications.

Figure 1:
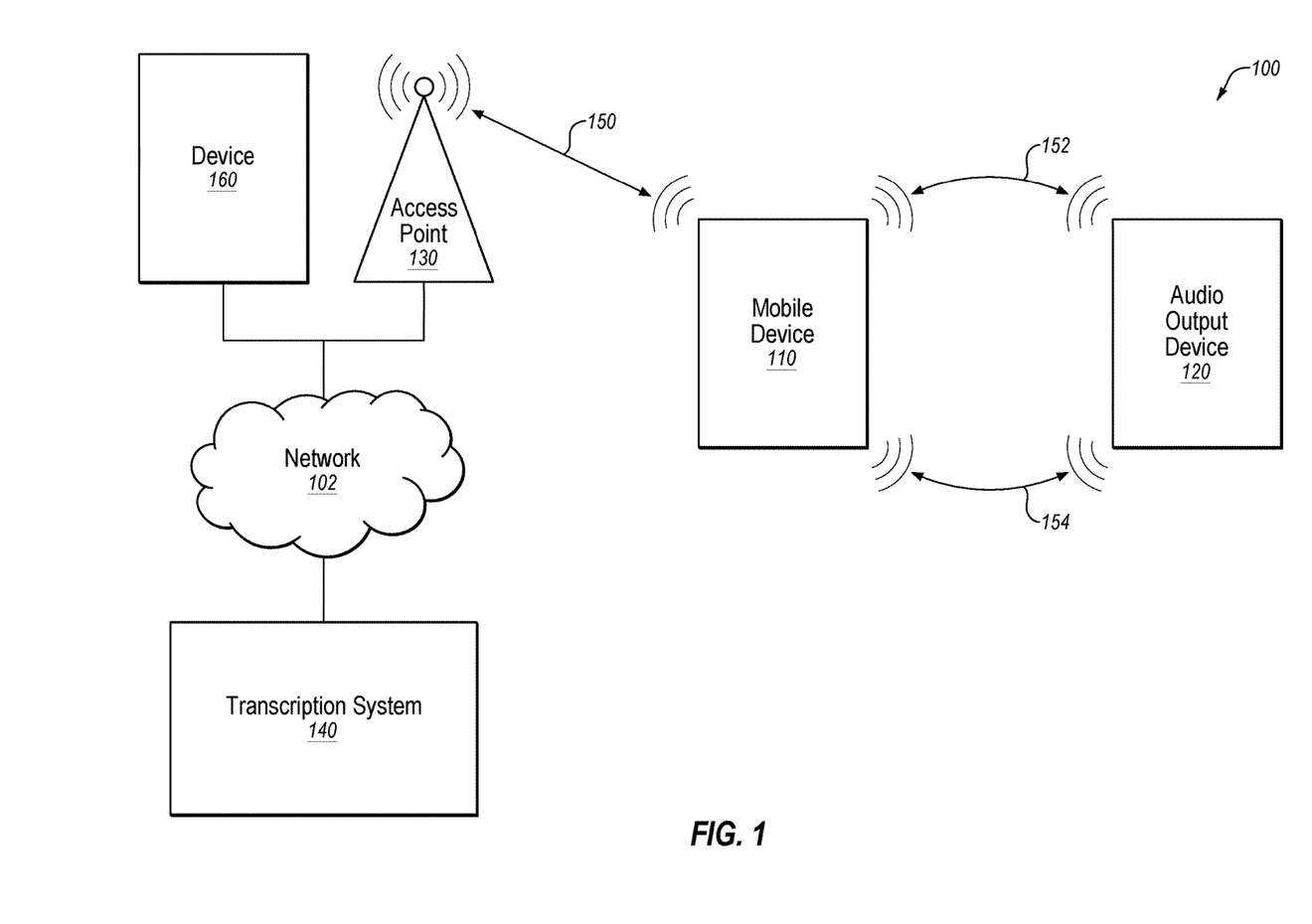
FIG. 1 illustrates an example system configured to provide transcriptions of an audio communication session.

Turning to the figures, FIG. 1 illustrates an example system 100 configured to provide transcripts of an audio communication session. The system 100 may be arranged in accordance with at least one embodiment described in the present disclosure. The system 100 may include a network 102, a mobile device 110, an audio output device 120, an access point 130, a transcription system 140, and a device 160.

The mobile device 110 may be any electronic or digital device. For example, the mobile device 110 may include a laptop computer, a smartphone, a mobile phone, a tablet computer, a phone console, or other processing device. The mobile device 110 may be configured to transfer data over a first wireless network 150, a second wireless network 152, and a third wireless network 154. For example, the mobile device 110 may communicate with the access point 130 over the first wireless network 150 and may communicate with the audio output device 120 over the second wireless network 152 and the third wireless network 154. In some embodiments, the first wireless network 150, the second wireless network 152, and the third wireless network 154 may be different types of wireless networks.

In some embodiments, the first wireless network 150 may be a cellular wireless network. For example, the first wireless network 150 may provide voice services, data services, messaging services, and/or any suitable combination thereof. The first wireless network 150 may include a Frequency Division Multiple Access (FDMA) network, an Orthogonal FDMA (OFDMA) network, a Code Division Multiple Access (CDMA) network, a Time Division Multiple Access (TDMA) network, and/or any other suitable wireless communication network. In some embodiments, the first wireless network 150 may be configured as a third generation (3G) wireless communication network and/or a fourth generation (4G) wireless communication network. In these or other embodiments, the first wireless network 150 may be configured as a long-term evolution (LTE) wireless communication network.

The second wireless network 152 and the third wireless network 154 may be configured as short-range wireless networks, such as a wireless local area network (LAN), a personal area network (PAN), or a wireless mesh network (WMN). For example, the second wireless network 152 and the third wireless network 154 may be networks that use Bluetooth Class 2 and Class 3 communications with protocols that are managed by the Bluetooth Special Interest Group (SIG). Other examples of wireless networks may include the IEEE 802.11 networks (commonly referred to as WiFi), Zigbee networks, among other types of LANS, PANS, and WMNS.

In some embodiments, the mobile device 110 may be configured to receive and transmit data over the first wireless network 150. For example, the mobile device 110 may be part of a communication session with the device 160 by way of the access point 130. In these and other embodiments, the communication session may be a phone call. As such, the communication session may be using protocols in the first wireless network 150 that are used for phone calls and that are handled differently within the mobile device 110 than other data transfers. For example, the communication session may be a cellular phone call that is not a Voice over Internet Protocol (VoIP) phone call. Alternatively or additionally, the communication session may be established using built-in calling functionality in the mobile device 110 that is not provided by a third-party application.

In some embodiments, the mobile device 110 may be configured to receive and to transmit data over the second wireless network 152 and the third wireless network 154 to communicate with the audio output device 120. In these and other embodiments, the mobile device 110 may be configured to receive and transmit data over the first wireless network 150, the second wireless network 152, and the third wireless network 154 during overlapping time frames. In some embodiments, the mobile device 110 may receive and transmit data in real time over each of the first wireless network 150, the second wireless network 152, and the third wireless network 154. In these and other embodiments, the mobile device 110 may receive and transmit data in real time over each of the first wireless network 150, the second wireless network 152, and the third wireless network 154 in substantially overlapping time intervals.

In some embodiments, an application associated with the transcription system 140 may be executed by the mobile device 110. In these and other embodiments, the application may be configured to communicate with the transcription system 140 over the first wireless network 150 and the network 102. In these and other embodiments, the application may be configured to provide audio data to the transcription system 140 and to receive transcripts of the audio data from the transcription system 140 over the first wireless network 150.

The audio output device 120 may be any electronic or digital device. In some embodiments, the audio output device 120 may be configured to receive and to transmit data over the second wireless network 152 and the third wireless network 154 to communicate with the audio output device 120. In some embodiments, the audio output device 120 may include a speaker and/or microphone. In these and other embodiments, the audio output device 120 may be configured to output data from the mobile device 110 by way of the speaker. In these and other embodiments, output of the data may include providing the data to a speaker. The speaker may act as a transducer to convert the data from analog electrical signals to sound waves that are broadcast by the speaker. Alternatively or additionally, the audio output device 120 may be configured to provide data to the mobile device 110 that is generated by the microphone based on sounds waves received by the audio output device 120.

In some embodiments, the audio output device 120 may also be configured to multiplex the data received from the mobile device 110 and/or generated by the audio output device 120. In these and other embodiments, the audio output device 120 may receive data by way of the second wireless network 152, may multiplex the data to output the data by way of speaker, and may transmit the data back to the mobile device 110 using the third wireless network 154. Alternatively or additionally, the audio output device 120 may generate data using the microphone. The audio output device 120 may multiplex the generated data and may provide the data to the mobile device 110 using the second wireless network 152 and the third wireless network 154.

The access point 130 may be any suitable wireless network communication point and may include a base station, an evolved node "B" (eNB) base station, a remote radio head (RRH), or any other suitable communication point. The access point 130 may be configured to establish the first wireless network 150 and to communicate data between devices. For example, the access point 130 may include protocol to communicate with the mobile device 110 and to maintain the first wireless network 150. In some embodiments, the access point 130 may be configured to relay data between the mobile device 110 and other devices in the system 100, such as the device 160 and the transcription system 140.

In some embodiments, the network 102 may be any network or configuration of networks configured to send and receive communications between devices. In these and other embodiments, the network 102 may be configured to communicatively couple the device 160 to the access point 130 and the access point 130 to the transcription system 140.

In some embodiments, the network 102 may include a conventional type network, a wired or wireless network, and may have numerous different configurations. Furthermore, the network 102 may include a local area network (LAN), a wide area network (WAN) (e.g., the Internet), or other interconnected data paths across which multiple devices and/or entities may communicate. In some embodiments, the network 102 may include a peer-to-peer network. The network 102 may also be coupled to or may include portions of a telecommunications network for sending data in a variety of different communication protocols. In some embodiments, the network 102 may include cellular communication networks for sending and receiving communications and/or data including via hypertext transfer protocol (HTTP), direct data connection, wireless application protocol (WAP), e-mail, etc. The network 102 may also include a mobile data network that may include third-generation (3G), fourth-generation (4G), long-term evolution (LTE), long-term evolution advanced (LTE-A), Voice-over-LTE ("VoLTE") or any other mobile data network or combination of mobile data networks. Further, the network 102 may include one or more IEEE 802.11 wireless networks. In some embodiments, the network 102 may be the same or different than the first wireless network 150, the second wireless network 152, and/or the third wireless network 154. In short, the network 102 may be any type or combination of networks that are configured to provide communications between devices.

In some embodiments, the device 160 may be any electronic, analog, or digital device. For example, the device 160 may include a laptop computer, a smartphone, a mobile phone, a tablet computer, a phone console, a public switched telephone network (PSTN) phone, or any other communication device. The device 160 may be configured to participate in a communication session with the mobile device 110. In the communication session, data, such as audio data may be exchanged between the device 160 and the mobile device 110 by way of the network 102 and the first wireless network 150. In these and other embodiments, the network 102 that communicatively couples the device 160 and the access point 130 may be the same as or different than the first wireless network 150.

In some embodiments, the transcription system 140 may include any configuration of hardware, such as processors, servers, and databases that are networked together and configured to generate transcripts by transcribing audio data received over the network 102. For example, the transcription system 140 may include multiple computing systems, such as multiple servers that each include memory and at least one processor, which are networked together and configured to perform operations as described in this disclosure, among other operations. In some embodiments, the transcription system 140 may include computer-readable-instructions that are configured to be executed by the transcription system 140 to perform operations described in this disclosure.

In some embodiments, the transcription system 140 may be configured to transcribe audio data received from the mobile device 110 to generate transcripts of the audio data. In some embodiments, the audio data may be data received by the mobile device 110 over the first wireless network 150, such as from the device 160. Alternatively or additionally, the audio data may be generated by the audio output device 120 and may be received by the mobile device 110 from the audio output device 120 over the second wireless network 152 or the third wireless network 154.

In some embodiments, the transcription system 140 may be configured to provide the generated transcripts to the mobile device 110 over the network 102 and the first wireless network 150. In these and other embodiments, the mobile device 110 may be configured to display the generated transcripts on a display of the mobile device 110.

An example of the operation of the system 100 follows. A communication session may be established between the mobile device 110 and the device 160 by way of the access point 130 using the first wireless network 150 and the network 102. For example, the mobile device 110 may call the device 160 to establish the communication session. Alternatively or additionally, the device 160 may call the mobile device 110 to establish the communication session.

The mobile device 110 may be used by a user that is hearing-impaired. As used in the present disclosure, a "hearing-impaired user" may refer to a person with diminished hearing capabilities. Hearing-impaired users often have some level of hearing ability that has usually diminished over a period of time such that the hearing-impaired user can communicate by speaking, but that the hearing-impaired user often struggles in hearing and/or understanding others.

During the communication session, the mobile device 110 may receive audio data over the first wireless network 150 from the access point 130. The audio data may originate from the device 160. For example, the audio data may be based on a voice signal from a user of the device 160. For example, the voice signal may be words spoken by the user of the device 160 during a conversation with the user of the mobile device 110 during the communication session.

The mobile device 110 may transmit the audio data over the second wireless network 152 to the audio output device 120. The audio output device 120 may multiplex the audio data to output the audio data by way of the speaker included in the audio output device 120 and to transmit the audio data over the third wireless network 154 to the mobile device 110.

The mobile device 110 may receive the audio data from the audio output device 120 by way of the third wireless network 154. The mobile device 110, by way of an application executed by the mobile device 110 and associated with the transcription system 140, may send the audio data received from the audio output device 120 over the first wireless network 150 to the transcription system 140. The transcription system 140 may transcribe the audio data to generate a transcript of the audio data. In some embodiments, to transcribe the audio data, a call assistant may listen to the audio data and "revoice" the words of the audio data to a speech recognition computer program tuned to the voice of the call assistant. In some embodiments, the transcript may be generated by the speech recognition computer.

The transcript of the audio data may be provided over the first wireless network 150 to the mobile device 110. In some embodiments, the mobile device 110, by way of the application associated with the transcription system 140 and an electronic display, may display the transcript while the hearing-impaired user carries on a normal conversation with a user of the device 160 during the communication session. The transcript may allow the hearing-impaired user to supplement the audio data received from the device 160 and confirm his or her understanding of the words spoken by the user of the device 160.

The system 100 may be configured to provide the transcript of the audio data in substantially real-time or real-time. For example, the transcript of the audio data may be provided to the mobile device 110 in less than 2, 3, 5, or 10 seconds after the audio data is presented to the user of the mobile device 110 by the audio output device 120.

As described, the system 100 may be configured to provide transcripts of audio data received by the mobile device 110. As discussed previously, in some circumstances, the mobile device 110 may be configured such that an application associated with the transcription system 140 executed by the mobile device 110 may be unable to obtain the audio data. As a result, the mobile device 110 may be unable to provide the audio data to the transcription system 140 for a transcript of the audio data. The system 100 may provide a manner for a transcript to be provided to the mobile device 110.

In some embodiments, the device 160 may be associated with a hearing impaired user and may be in communication with the transcription system 140. In these and other embodiments, the audio output device 120 may capture words spoken by the user of the mobile device 110 as audio data. The audio output device 120 may send the audio data to the mobile device 110 over the second wireless network 152 and/or the third wireless network 154. The audio data transmitted over the second wireless network 152 may be sent to the device 160 as audio data for presentation to the user of the device 160 as normal audio data. The mobile device 110, by way of an application associated with the transcription system 140, may transmit the audio data received over the second wireless network 152 and/or third wireless network 154 to the transcription system 140 with an indication that the transcript be provided to the device 160. The transcription system 140 may transcribe the audio data and provide the transcript to the device 160. The device 160 may present the transcript on a display of the device 160 for the hearing-impaired user of the device 160. Alternatively or additionally, the device 160 may be associated with an audio output device 120 and may receive transcripts of audio data originating from the mobile device 110 in a manner analogous to how the mobile device 110 receives transcripts.

Modifications, additions, or omissions may be made to the system 100 without departing from the scope of the present disclosure. For example, in some embodiments, the system 100 may include additional devices similar to the mobile device 110. Alternatively or additionally, the device 160 may be paired with another device that is similar to the audio output device 120. Alternatively or additionally, one or more of the communication couplings between the mobile device 110 and the audio output device 120 may be a wired connection. In these and other embodiments, the second wireless network 152 may be a wired network. Alternatively or additionally, the third wireless network 154 may be a wired network.

In some embodiments, the mobile device 110 and the audio output device 120 may be communicatively coupled by one wireless or wired network. In these and other embodiments, audio data may be received by the audio output device 120, multiplexed, and sent back to the mobile device 110 using the same wireless or wired network.

Figure 2:
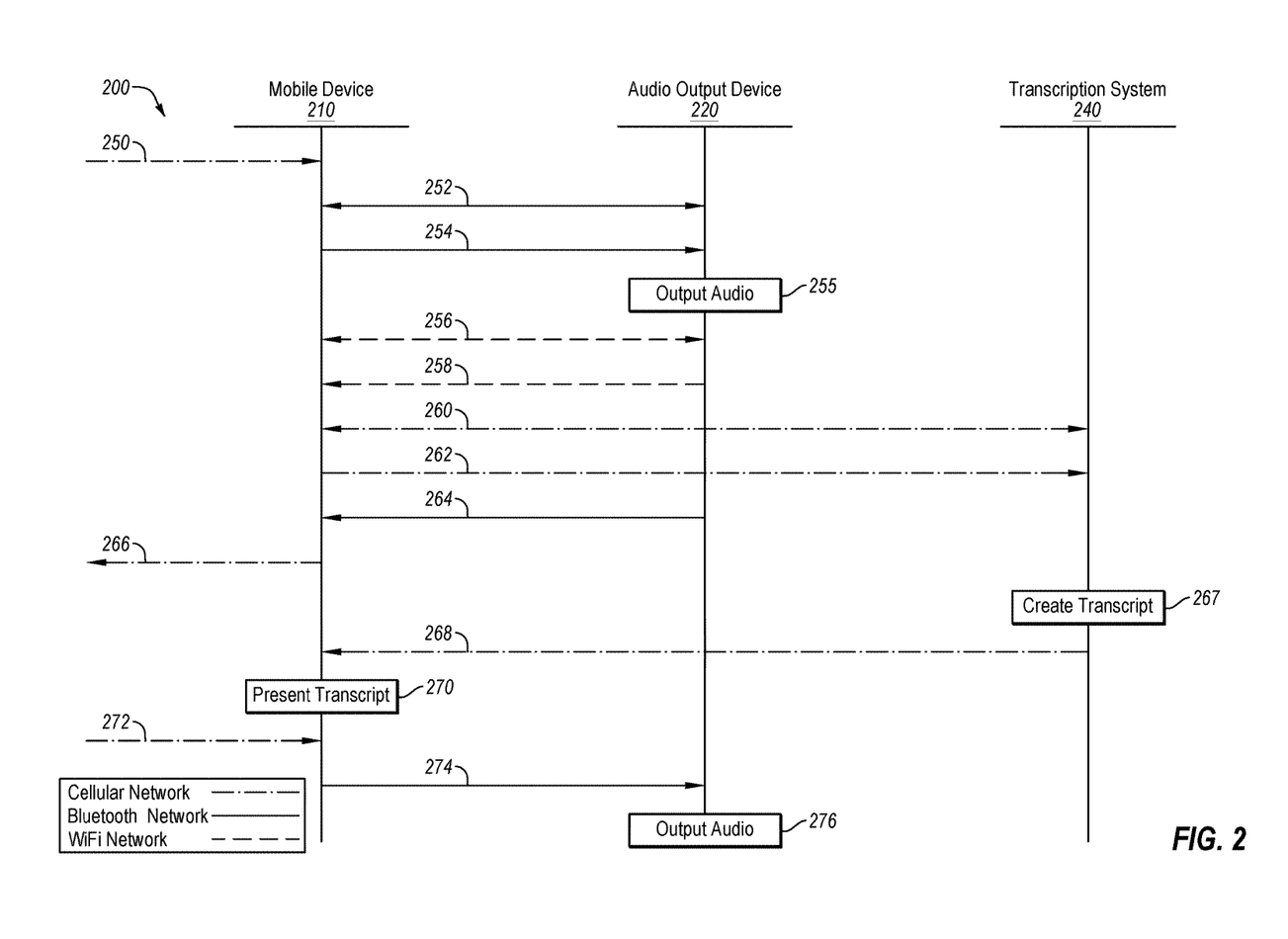
FIG. 2 illustrates example operations in a system configured to provide transcriptions of an audio communication session.

FIG. 2 illustrates example operations 200 in a system configured to provide transcriptions of an audio communication session. The operations 200 may be arranged in accordance with at least one embodiment described in the present disclosure. The operations 200 illustrated are not exhaustive but are merely representative of operations 200 that may occur. Furthermore, one operation as illustrated may represent one or more communications, operations, and/or data exchanges. Alternatively or additionally, the ordering of the operations 200 may differ than that illustrated in FIG. 2.

The operations 200 may occur between a mobile device 210, an audio output device 220, and a transcription system 240. In some embodiments, the mobile device 210, the audio output device 220, and the transcription system 240 may be analogous to the mobile device 110, the audio output device 120, and the transcription system 140, respectively, of FIG. 1. Accordingly, no further explanation is provided with respect thereto.

In some embodiments, the operations 200 may be an example of communications and interactions between the mobile device 210, the audio output device 220, and the transcription system 240 that may occur over one or more networks. For example, the mobile device 210 may be configured to exchange data over three different wireless networks, a cellular network, a Bluetooth network, and a WIFI network. In these and other embodiments, the mobile device 210 and the audio output device 220 may be configured to exchange data over two different wireless networks, a Bluetooth network and a WIFI network. Lines representing operations 200 that may occur or partially occur over a wireless network are represented differently depending on the wireless network used for those operations 200. For example, in FIG. 2, a solid line may represent an operation, such as a communication, over a Bluetooth network. A dashed line may represent an operation, such as a communication, over a WIFI network. A dash-dot line may represent an operation, such as a communication, over a cellular network. Each of these networks may have different protocols, operating frequencies, and/or data packet configurations.

The operations 200 may include obtaining 250 first audio data at the mobile device 210 over a cellular network. The first audio data may be obtained from another device. In some embodiments, the first audio data may be based on voice signals received at the other device during a communication session between the mobile device 210 and the other device.

A Bluetooth wireless connection may be established 252 between the mobile device 210 and the audio output device 220. In these and other embodiments, the mobile device 210 and the audio output device 220 may exchange one or more packets of data following Bluetooth protocols to establish the Bluetooth wireless connection. In these and other embodiments, the Bluetooth audio connection may be established to stream audio data from the mobile device 210 to the audio output device 220.

In some embodiments, the audio data streamed between the mobile device 210 and the audio output device 220 may be streamed using an advanced audio distribution profile (A2DP). In these and other embodiments, the mobile device 210 may act as the source device and the audio output device 220 may act as the sink device.

The mobile device 210 may transmit and the audio output device 220 may receive 254, the first audio data from the cellular network. In these and other embodiments, the mobile device 210 may decode the first audio data from the cellular network, obtain the data packets, and repackage the data packets based on the Bluetooth protocol to transmit the audio data to the audio output device 220 over the Bluetooth network.

After receiving the first audio data, the audio output device 220 may decode the first audio data and multiplex the first audio data into first and second audio data streams. The first audio data stream may be output 255 at a speaker. In these and other embodiments, to output the first audio data stream, the first audio data stream may be sent to a speaker that may act as a transducer to convert the analog or digital first audio data stream to sound waves that may be heard by the user of the mobile device 210.

A WiFi wireless connection may be established 256 between the mobile device 210 and the audio output device 220. In these and other embodiments, the mobile device 210 and the audio output device 220 may exchange one or more packets of data following WiFi protocols to establish the WiFi wireless connection. In these and other embodiments, the WiFi audio connection may be established to stream audio data from the mobile device 210 to the audio output device 220. In some embodiments, the WiFi wireless connection may be established using an access point of a WiFi wireless network. In these and other embodiments, the access point may act as a router to route data communications between the mobile device 210 and the audio output device 220.

The audio output device 220 may transmit and the mobile device 210 may receive 258, the second audio data stream over the WiFi network. In these and other embodiments, the audio output device 220 may encode the second audio data stream based on the WiFi protocol to transmit the audio data to the mobile device 210 over the WiFi network. After receiving the audio data, the mobile device 210 may decode the second audio data stream and prepare the second audio data stream for transmission to the transcription system 240.

A network connection may be established 260 between the mobile device 210 and the transcription system 240. In these and other embodiments, the mobile device 210 and the transcription system 240 may exchange one or more packets of data to establish a connection between the mobile device 210 and the transcription system 240. For example, an application associated with the transcription system 240 may be executed by the mobile device 210. The application may include authentication protocols to establish a network connection with a server of the transcription system 240 to allow for the exchange of information between the mobile device 210 and the transcription system 240.

The mobile device 210 may transmit and the transcription system 240 may receive 262 the second audio data stream over the cellular network. In these and other embodiments, the transcription system 240 may decode the second audio data stream from the cellular network, may obtain the data packets, and may create a transcript 267 using the data packets. The transcription system 240 may transmit and the mobile device 210 may receive 268 the transcript over the cellular network.

The audio output device 220 may further generate second audio data. For example, the second audio data may be generated based on voice signals captured by the audio output device 220 from a user of the mobile device 210 and the audio output device 220. The audio output device 220 may encode the second audio data based on the Bluetooth connection. The audio output device 220 may transmit and the mobile device 210 may receive 264 the second audio data over the Bluetooth network. The mobile device 210 may decode the second audio data, may encode the second audio data based on the cellular network protocols, and may transmit the second audio data 266 over the cellular network. The second audio data may be part of a communication session between the mobile device 210 and the other device.

The mobile device 210 may present the transcript 270 to the user of the mobile device 210. For example, the mobile device 210 may display the transcript on an electronic display of the mobile device 210. By displaying the transcript, a user of the mobile device 210 may read and hear the first audio data.

The operations 200 may continue. For example, the operations 200 may include obtaining 272 third audio data at the mobile device 210 over the cellular network. The third audio data may be obtained from the other device. The mobile device 210 may transmit and the audio output device 220 may receive 274, the third audio data from the cellular network.

After receiving the third audio data, the audio output device 220 may decode the third audio data and may multiplex the third audio data into third and fourth audio data streams. The third audio data stream may be output 276 at a speaker. The fourth audio data stream may be transmitted back to the mobile device 210 by the audio output device 220 over the WiFi network.

Modifications, additions, or omissions may be made to the operations 200 without departing from the scope of the present disclosure. For example, in some embodiments, the order of the operations 200 may change. For example, the establishment of the Bluetooth network connection 252, the WiFi network connection 256, and the network connection 260 may occur before the first audio data is obtained 250. Alternatively or additionally, the establishment of network connections may occur during other times. Furthermore, the operations 200 may not occur in a linear fashion as illustrated, but may overlap in time such that they occur at substantially the same time. For example, some of the operations, such as the transmitting and receiving of the second audio data between the audio output device 220 and the mobile device 210 may occur while the first audio data is transmitted to the transcription system 240 from the mobile device 210.

Figure 3:
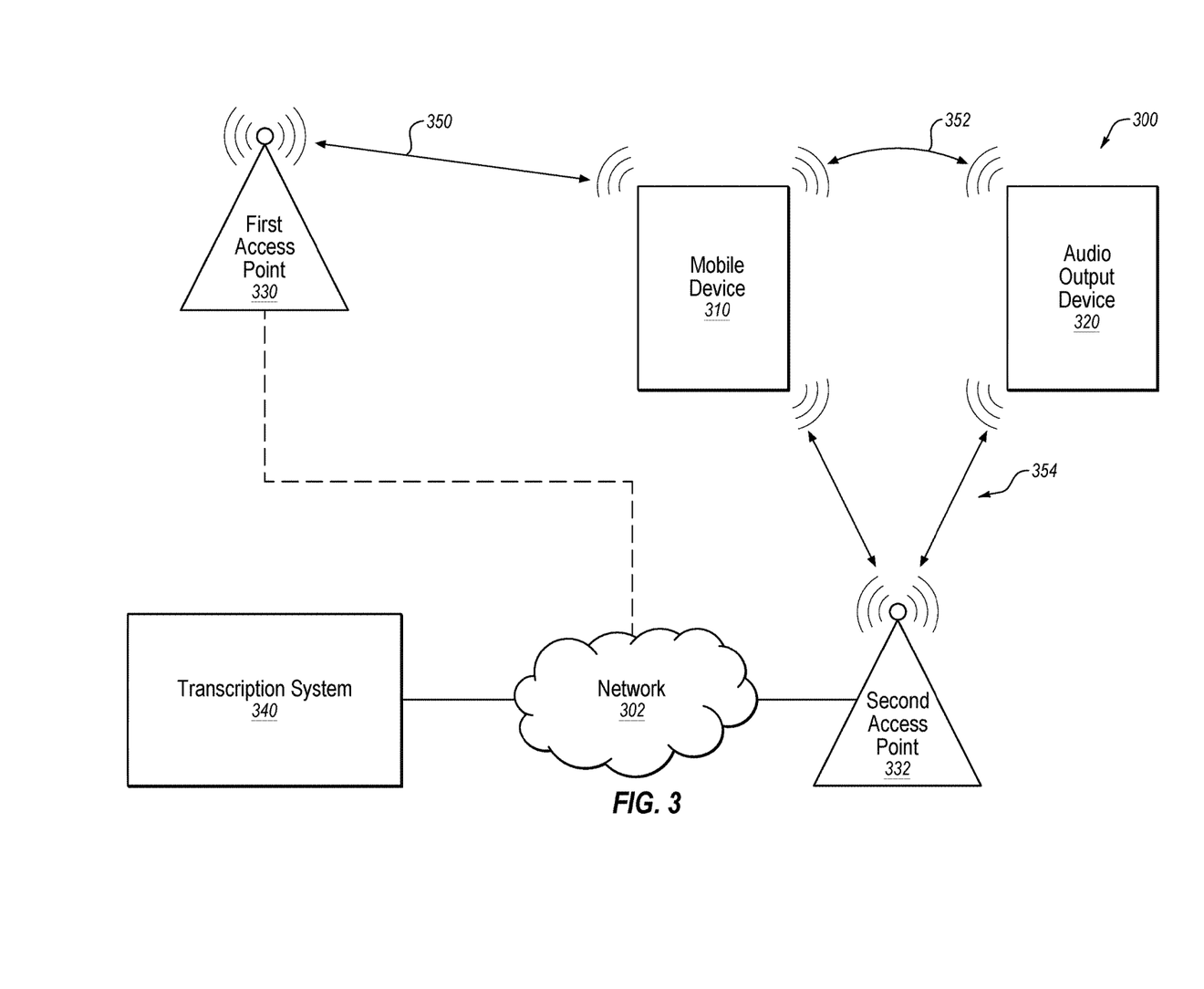
FIG. 3 illustrates another example system configured to provide transcriptions of an audio communication session.

FIG. 3 illustrates another example system 300 configured to provide transcriptions of an audio communication session. The system 300 may be arranged in accordance with at least one embodiment described in the present disclosure. The system 300 may include a network 302, a mobile device 310, an audio output device 320, a first access point 330, a second access point 332, and a transcription system 340. In some embodiments, the network 302, the mobile device 310, the audio output device 320, the first access point 330, and the transcription system 340 may be analogous to the network 102, the mobile device 110, the audio output device 120, the access point 130, and the transcription system 140 respectively, of FIG. 1. Accordingly, no further explanation is provided with respect thereto.

The mobile device 310 may be configured to transfer data over a first wireless network 350, a second wireless network 352, and a third wireless network 354. The first wireless network 350 and the second wireless network 352 may be analogous to the first wireless network 150 and the second wireless network 152 of FIG. 1. Accordingly, no further explanation is provided with respect thereto. As illustrated in FIG. 3, the mobile device 310 may communicate with the first access point 330 over the first wireless network 350, may communicate with the audio output device 320 over the second wireless network 352, and may communicate with the second access point 332 over the third wireless network 354. In some embodiments, the first wireless network 350, the second wireless network 352, and the third wireless network 354 may be different types of wireless networks.

The system 300 may operate in some respects in a manner analogous to the system 100 of FIG. 1. For example, the mobile device 310 may receive audio data over the first wireless network 350. The mobile device 310 may send the audio data to the audio output device 320 over the second wireless network 352. The audio output device 320 may multiplex the audio data to send a first stream of the audio data to be output by the audio output device 320 and to send a second stream of the audio data to the transcription system 340.

In contrast to system 100, the system 300 may include the second access point 332. The second access point 332 may be any suitable wireless network communication point for the third wireless network 354. For example, the third wireless network 354 may be a WiFi network and second access point 332 may be a WiFi wireless router configured to establish the third wireless network 354.

In some embodiments, the audio output device 320 may establish a network connection with the transcription system 340 through the third wireless network 354, the second access point 332, and the network 302. In these and other embodiments, the audio output device 320 may send the second stream of the audio data to the transcription system 340 by way of the second access point 332. In these and other embodiments, the mobile device 310 may not receive the second stream of the audio data.

In some embodiments, the transcript generated by the transcription system 340 may be provided to the mobile device 310 by way of the third wireless network 354. In these and other embodiments, the mobile device 310 may establish a network connection with the transcription system 340 through the third wireless network 354, the second access point 332, and the network 302. After the transcription system 340 generates the transcript of the audio data, the transcription system 340 may provide the audio data to the mobile device 310 for presentation.

In these and other embodiments, the audio output device 320 may be configured to establish the network connection with the transcription system 340 using the mobile device 310. For example, the mobile device 310 may provide an IP address and authentication information to the audio output device 320. The audio output device 320 may use the IP address and authentication information to establish the network connection with the transcription system 340. Alternatively or additionally, the audio output device 320 may include a user interface or other connection with another device to obtain the information for the network connection with the transcription system 340.

In some embodiments, the mobile device 310 may not have a network connection with the transcription system 340 by way of the third wireless network 354. Rather, a network connection with the transcription system 340 may be established using the first wireless network 350. In these and other embodiments, the transcription system 340 may provide the transcripts of audio data to the mobile device 310 by way of the first access point 330 and the first wireless network 350.

Modifications, additions, or omissions may be made to the system 300 without departing from the scope of the present disclosure. For example, in some embodiments, the transcription system 340 may provide the transcript to the audio output device 320 through the third wireless network 354. In some embodiments, the audio output device 320 may present the transcript and/or the audio output device 320 may relay the transcript to the mobile device 310.

Figure 4:
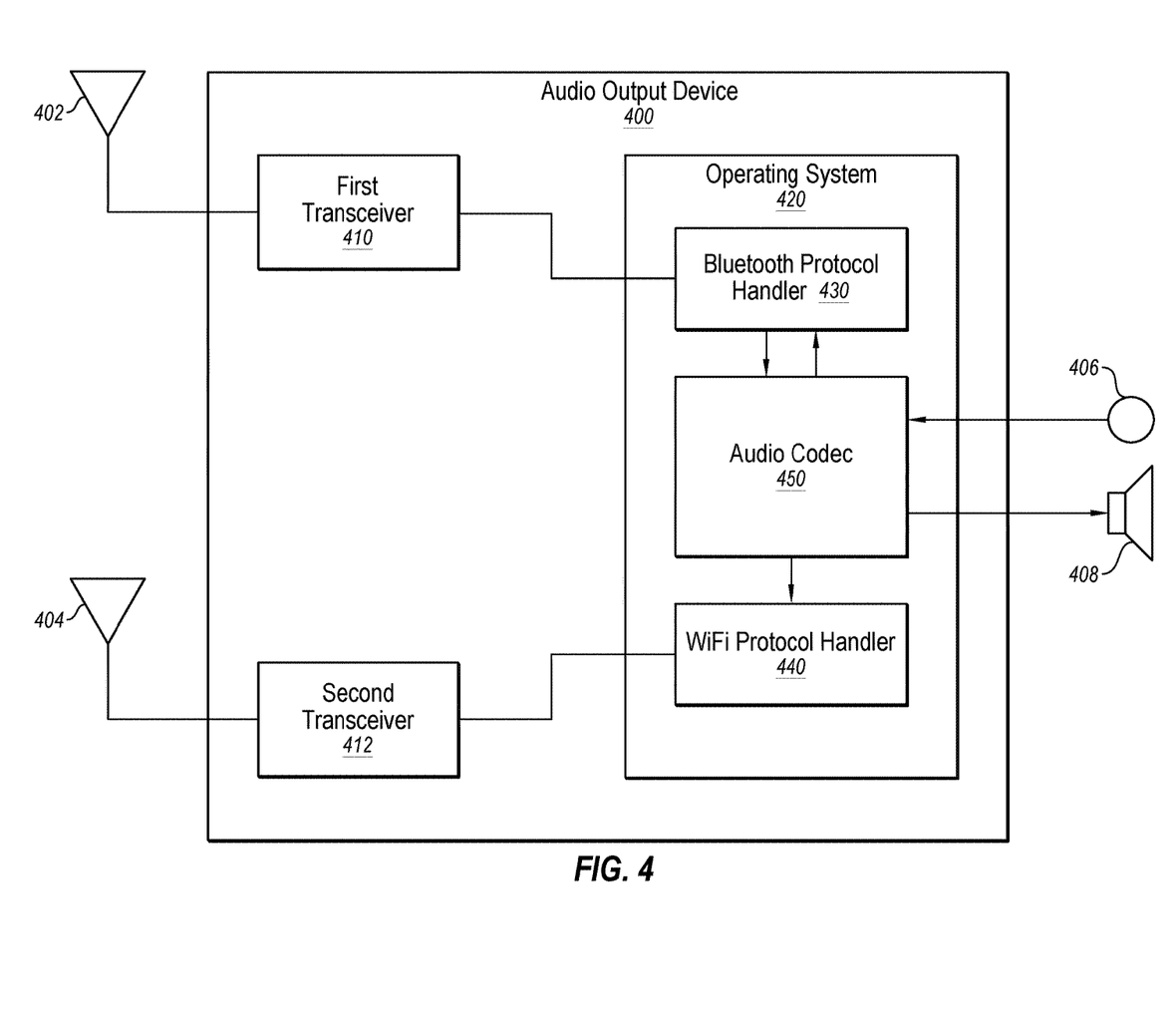
FIG. 4 illustrates an example audio output device.

FIG. 4 illustrates an example audio output device 400. The audio output device 400 may be an example of the audio output device 120 of FIG. 1, the audio output device 220 of FIG. 2, and/or the audio output device 320 of FIG. 3. The audio output device 400 may include a first antenna 402, a second antenna 404, a microphone 406, a speaker 408, a first transceiver 410, a second transceiver 412, an operating system 420, a Bluetooth protocol handler 430, a WiFi protocol handler 440, and an audio codec 450.

The first antenna 402 may be configured to transmit and receive data over a first wireless network. To transmit data, the first antenna 402 may receive the data from the first transceiver 410. When receiving data, the first antenna 402 may provide the received data to the first transceiver 410. The first transceiver 410 may be configured to handle the transmission and receiving of data over the first antenna 402. In these and other embodiments, the first transceiver 410 may be configured to encode and decode signals at the operating frequency of the first wireless network.

The second antenna 404 may be configured to transmit and receive data over a second wireless network. To transmit data, the second antenna 404 may receive the data from the second transceiver 412. When receiving data, the second antenna 404 may provide the received data to the second transceiver 412. The second transceiver 412 may be configured to handle the transmission and receiving of data over the second antenna 404. In these and other embodiments, the second transceiver 412 may be configured to encode and decode signals at the operating frequency of the second wireless network.

The operating system 420 may include the Bluetooth protocol handler 430, the WiFi protocol handler 440, and the audio codec 450. The Bluetooth protocol handler 430 may be configured to handle the wireless protocols for the first wireless network. For example, the Bluetooth protocol handler 430 may handle the signaling protocols to establish and maintain the first wireless network. Alternatively or additionally, the Bluetooth protocol handler 430 may be configured to encode data into data packets for transmission over the first wireless network as well as to extract data from data packets received over the first wireless network.

The WiFi protocol handler 440 may be configured to handle the wireless protocols for the second wireless network. For example, the WiFi protocol handler 440 may handle the signaling protocols and the encoding and the decoding of data packets for the second wireless network as well as to extract data from data packets received over the second wireless network.

The microphone 406 may be configured to receive sound waves and to convert the sound waves to analog audio data. The analog audio data may be provided to the audio codec 450. The speaker 408 may be configured to receive analog audio data from the audio codec 450 and to convert the analog audio data to sound waves that are broadcast from the audio output device 400.

The audio codec 450 may be configured to receive analog audio data from the microphone 406 and to convert the analog audio data to digital audio data. The audio codec 450 may be further configured to process the digital and/or analog audio data from the microphone 406. In some embodiments, the audio codec 450 may multiplex the audio data after it is received from the microphone 406 into a first stream and a second stream. In these and other embodiments, the audio codec 450 may provide the first stream to the Bluetooth protocol handler 430 and may provide the second stream to the WiFi protocol handler 440 for transmission by the first antenna 402 and the second antenna 404, respectively. Alternatively or additionally, the audio codec 450 may be configured to pass the audio data without multiplexing the audio data from the microphone 406 to the Bluetooth protocol handler 430 for transmission by the first antenna 402.

The audio codec 450 may be further configured to receive digital audio data from the Bluetooth protocol handler 430. The digital audio data may be received over the first network by the first antenna 402. The audio codec 450 may multiplex the digital audio data into a first stream and a second stream. The first stream may be provided to the WiFi protocol handler 440 for encoding and transmission over the second network by way of the second antenna 404. The second stream may be decompressed based on a compression scheme applied to the digital audio data. After decompression, the digital audio data may be converted to analog audio data and provided to the speaker 408.

In some embodiments, the audio codec 450 may multiplex digital audio data by making a copy of the digital audio data. Alternatively or additionally, the audio codec 450 may multiplex the digital audio data by driving the digital audio data received by the Bluetooth protocol handler 430 and stored in the audio codec 450 to two different locations, namely, the speaker 408 and the WiFi protocol handler 440. For example, the digital audio data may be received by the audio codec 450 from the Bluetooth protocol handler 430. The audio codec 450 may direct the digital audio data to the WiFi protocol handler 440. Additionally, the audio codec 450 may direct the digital audio data to be decoded based on the compression scheme of the digital audio data, to be converted to analog audio data, and to be sent to the speaker 408.

Modifications, additions, or omissions may be made to the audio output device 400 without departing from the scope of the present disclosure. For example, in some embodiments, the audio output device 400 may include additional components, such as a display. Alternatively or additionally, the audio output device 400 may include fewer components. For example, in some embodiments, the audio output device 400 may include a single antenna for both the first and second wireless networks. As another example, the audio output device 400 may include alternative components. For example, the Bluetooth protocol handler 430 and the WiFi protocol handler 440 may be performed by a processor, such as a processor discussed with respect to FIG. 5.

Figure 5:
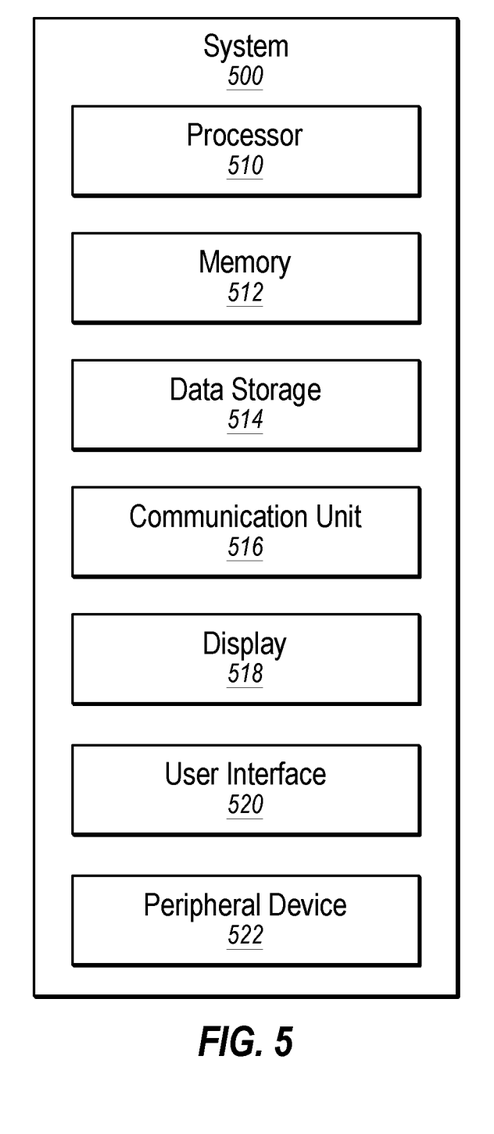
FIG. 5 illustrates an example system that may be used in providing transcriptions of an audio communication session.

FIG. 5 illustrates an example computing system 500 that may be used in obtaining VoIP credentials for a device. The system 500 may be arranged in accordance with at least one embodiment described in the present disclosure. The system 500 may include a processor 510, a memory 512, a data storage 514, a communication unit 516, an electronic display 518, a user interface unit 520, and a peripheral device 522. In some embodiments, the system 500 may be part of any of the systems or devices described in this disclosure. For example, the system 500 may be part of the mobile device 110, the audio output device 120, and/or the transcription system 140 of FIG. 1.

Generally, the processor 510 may include any suitable special-purpose or general-purpose computer, computing entity, or processing device including various computer hardware or software modules and may be configured to execute instructions stored on any applicable computer-readable storage media. For example, the processor 510 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 5, it is understood that the processor 510 may include any number of processors distributed across any number of networks or physical locations that are configured to perform individually or collectively any number of operations described herein. In some embodiments, the processor 510 may interpret and/or execute program instructions and/or process data stored in the memory 512, the data storage 514, or the memory 512 and the data storage 514. In some embodiments, the processor 510 may fetch program instructions from the data storage 514 and load the program instructions into the memory 512.

After the program instructions are loaded into the memory 512, the processor 510 may execute the program instructions. For example, the system 500 may be part of the mobile device 110 of FIG. 1. In these and other embodiments, the instructions may include the processor 510 instructing the communication unit 516 to establish a network connection with the audio output device 120 over the second and the third wireless networks 152 and 154. Alternatively or additionally, the instructions may include the processor 510 instructing the communication unit 516 to transmit audio data to the transcription system 140. Alternatively or additionally, the instructions may include the processor 510 instructing the electronic display 518 to display a transcript received from the transcription system 140. Alternatively or additionally, the instructions may include the processor 510 executing instructions for an application that communicates with the transcription system 140 as described.

As another example, the system 500 may be part of the audio output device 120. In these and other embodiments, the instructions may include the processor 510 instructing the encoding and decoding of audio data for both of the second and the third wireless networks 152 and 154.

The memory 512 and the data storage 514 may include computer-readable storage media or one or more computer-readable storage mediums for carrying or having computer-executable instructions or data structures stored thereon. Such computer-readable storage media may be any available media that may be accessed by a general-purpose or special-purpose computer, such as the processor 510. By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. In these and other embodiments, the term "non-transitory" as used herein should be construed to exclude only those types of transitory media that were found to fall outside the scope of patentable subject matter in the Federal Circuit decision of *In re Nuijten,* 500 F.3d 1346 (Fed. Cir. 2007). In some embodiments, computer-executable instructions may include, for example, instructions and data configured to cause the processor 510 to perform a certain operation or group of operations, such as one or more of the operations 200, one or more blocks of the method 600, and/or one or more blocks of the method 700.

The communication unit 516 may include any component, device, system, or combination thereof that is configured to transmit or receive information over a network. In some embodiments, the communication unit 516 may communicate with other devices at other locations, the same location, or even other components within the same system. For example, the communication unit 516 may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, etc.), and/or the like. The communication unit 516 may permit data to be exchanged with a network and/or any other devices or systems described in the present disclosure.

The electronic display 518 may be configured as one or more electronic displays, like an LCD, LED, or other type display. The electronic display 518 may be configured to present video, text captions, user interfaces, and other data as directed by the processor 510.

The user interface unit 520 may include any device to allow a user to interface with the system 500. For example, the user interface unit 520 may include a mouse, a track pad, a keyboard, and/or a touchscreen, among other devices. The user interface unit 520 may receive input from a user and provide the input to the processor 510.

The peripheral devices 522 may include one or more devices. For example, the peripheral devices may include a microphone, an imager, and/or a speaker, among other peripheral devices. In these and other embodiments, the microphone may be configured to capture audio. The imager may be configured to capture digital images. The digital images may be captured in a manner to produce video or image data. In some embodiments, the speaker may broadcast audio received by the system 500 or otherwise generated by the system 500.

Modifications, additions, or omissions may be made to the system 500 without departing from the scope of the present disclosure. For example, when the system 500 is part of the audio output device 120 of FIG. 1, the system 500 may not include one or more of the electronic display 518, the peripheral devices 522, or other aspects of the system 500.

Figure 6:
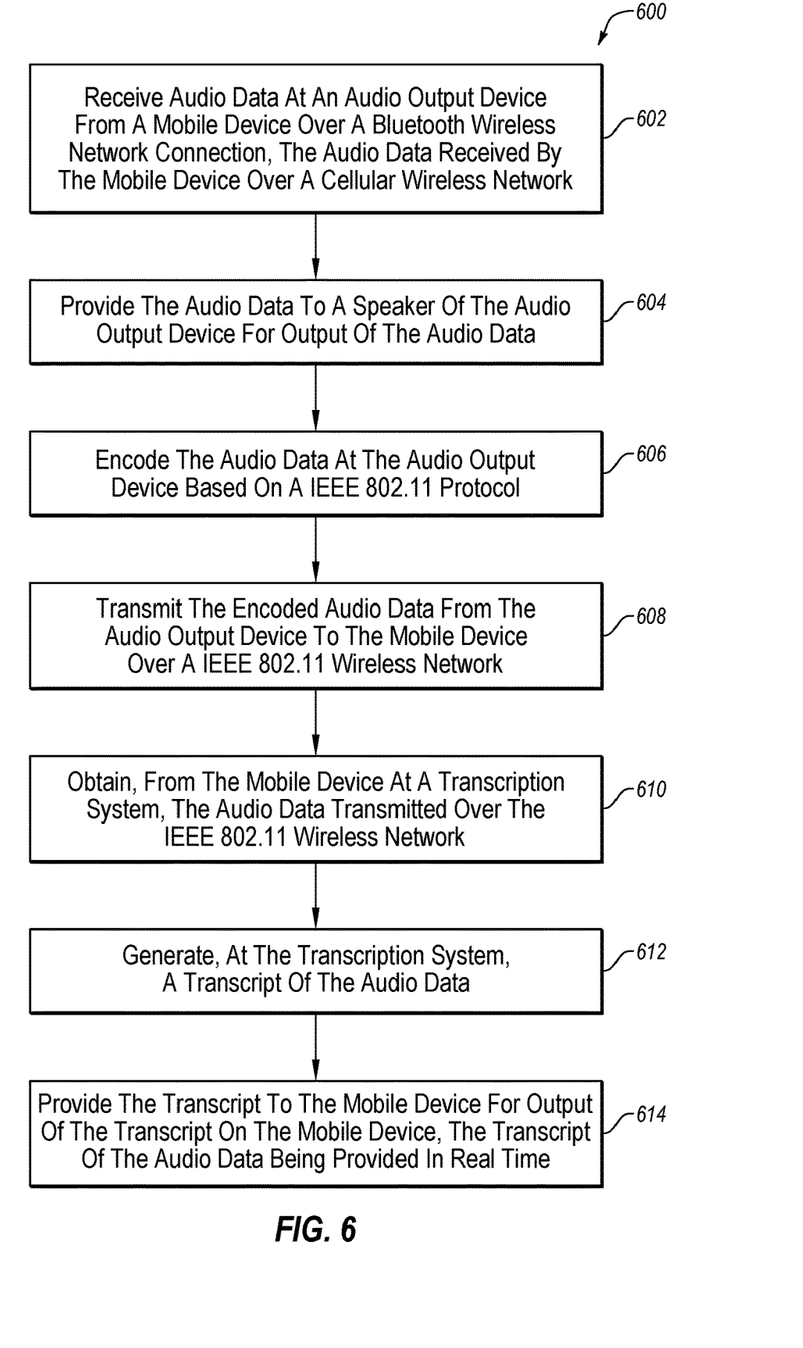
FIG. 6 is a flowchart of an example computer-implemented method to provide transcriptions of an audio communication session.

FIG. 6 is a flowchart of an example computer-implemented method to provide transcriptions of an audio communication session. The method 600 may be arranged in accordance with at least one embodiment described in the present disclosure. The method 600 may be performed, in whole or in part, in some embodiments by a system, such as the system 100, the system 300, the audio output device 400, and/or the system 500 of FIGS. 1, 3, 4, and 5, respectively. In these and other embodiments, the method 600 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method 600 may begin at block 602, where audio data may be received at an audio output device from a mobile device over a Bluetooth wireless network connection. In some embodiments, the audio data may be received by the mobile device over a cellular wireless network. In some embodiments, the mobile device may be a smartphone, laptop, or tablet. In some embodiments, the audio output device may be a Bluetooth wireless headset that is paired with the mobile device. In some embodiments, the audio data may be provided from the mobile device to the transcription system at least partially over the cellular wireless network.

In block 604, the audio data may be provided to a speaker of the audio output device for output of the audio data. In block 606, the audio data may be encoded at the audio output device based on an IEEE 802.11 protocol.

In block 608, the encoded audio data may be transmitted from the audio output device to the mobile device over an IEEE 802.11 wireless network. In block 610, the audio data transmitted over the IEEE 802.11 wireless network may be obtained from the mobile device at a transcription system.

In block 612, a transcript of the audio data may be generated at the transcription system. In block 614, the transcript may be provided to the mobile device for output of the transcript on the mobile device. In some embodiments, the transcript of the audio data may be provided in real time.

One skilled in the art will appreciate that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

Figure 7:
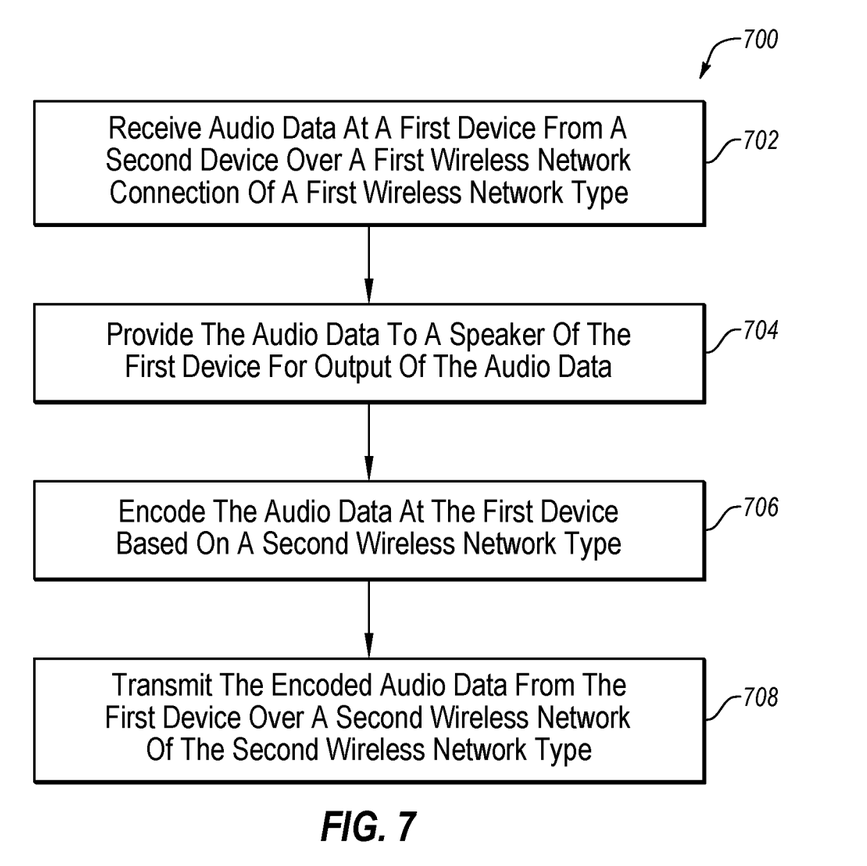
FIG. 7 is a flowchart of another example computer-implemented method to provide transcriptions of an audio communication session.

FIG. 7 is a flowchart of another example computer-implemented method to provide transcriptions of an audio communication session. The method 700 may be arranged in accordance with at least one embodiment described in the present disclosure. The method 700 may be performed, in whole or in part, in some embodiments by a system, such as the system 100, the system 300, the audio output device 400, and/or the system 500 of FIGS. 1, 3, 4, and 5, respectively. In these and other embodiments, the method 700 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method 700 may begin at block 702, where audio data may be received at a first device from a second device over a first wireless network connection of a first wireless network type. In some embodiments, the audio data may be received by the second device over a cellular wireless network.

In block 704, the audio data may be provided to a speaker of the first device for output of the audio data. In block 706, the audio data may be encoded at the first device based on a second wireless network type. In some embodiments, the first wireless network type may be a Bluetooth wireless network and the second wireless network type may be an IEEE 802.11 wireless network.

In block 708, the encoded audio data may be transmitted from the first device over a second wireless network of the second wireless network type. In some embodiments, the audio data may be transmitted from the first device over the second wireless network to the second device. Alternatively or additionally, the audio data may be transmitted from the first device over the second wireless network to a network access point of the second wireless network.

One skilled in the art will appreciate that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

For example, in some embodiments, the method 700 may further include obtaining, at a transcription system, the audio data transmitted over the second wireless network and generating, at the transcription system, a transcript of the audio data.

Alternatively or additionally, the method 700 may further include providing the transcript to the second device for output of the transcript on the second device. In these and other embodiments, the transcript of the audio data may be provided in real time. Alternatively or additionally, the audio data may be obtained at the transcription system by way of the second device that receives the encoded audio data by way of the second wireless network. In these and other embodiments, the audio data may be obtained at the transcription system by way of a network access point of the second wireless network that receives the encoded audio data by way of the second wireless network.

As indicated above, the embodiments described herein may include the use of a special purpose or general purpose computer (e.g., the processor 510 of FIG. 5) including various computer hardware or software modules, as discussed in greater detail below. Further, as indicated above, embodiments described herein may be implemented using computer-readable media (e.g., the memory 512 or data storage 514 of FIG. 5) for carrying or having computer-executable instructions or data structures stored thereon.

In some embodiments, the different components, modules, engines, and services described herein may be implemented as objects or processes that execute on a computing system (e.g., as separate threads). While some of the systems and methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A computer-implemented method to provide transcriptions of an audio communication session, the method comprising:

receiving audio data at an audio output device from a first device over a first wireless network, the audio data received by the first device over a second wireless network from a remote device that generated the audio data and the second wireless network is a different type of wireless network than the first wireless network;

multiplexing the audio data to generate first multiplexed audio data and second multiplexed audio data;

providing the first multiplexed audio data to a speaker of the audio output device for output of the first multiplexed audio data;

transmitting, by the audio output device, the second multiplexed audio data to a transcription system, the transcription system configured to generate a transcript of the second multiplexed audio data;

obtaining, at the audio output device, the transcript from the transcription system; and presenting, by the audio output device, the transcript.

2. The method of claim 1, wherein the first device is a smartphone, a laptop, or a tablet.

3. The method of claim 1, wherein the second multiplexed audio data is transmitted to the transcription system over a third wireless network and the third wireless network is a different type of wireless network than the first wireless network and the second wireless network.

4. The method of claim 3, wherein the third wireless network is a IEEE 802.11 wireless network and the second wireless network is a cellular wireless network.

5. The method of claim 1, wherein the first wireless network is a BLUETOOTH wireless network and the audio output device is paired with the first device.

6. The method of claim 1, wherein the first multiplexed audio data and the second multiplexed audio data are the same as the audio data.

7. The method of claim 1, wherein the transcript is presented in substantially real time with the output of the first multiplexed audio data.

8. A computer-implemented method to provide transcriptions of an audio communication session, the method comprising:

receiving audio data at a first device over a first network;

providing, from the first device, the audio data to a second device over a second network that is different than the first network;

transmitting, to a transcription system from the second device, the audio data over a third network, the third network is a different type of network than the first network and the second network and the transcription system is configured to generate a transcript of the audio data;

obtaining, at the second device from the transcription system by way of the third network, the transcript of the audio data;

providing the transcript to the first device from the second device by way of the second network; and presenting the transcript by the first device.

9. The method of claim 8, further comprising:

multiplexing the audio data to generate first multiplexed audio data and second multiplexed audio data; and providing the first multiplexed audio data to a speaker for output of the first multiplexed audio data.

10. The method of claim 9, wherein the audio data transmitted to the transcription system is the second multiplexed audio data.

11. The method of claim 8, wherein the second network is a IEEE 802.11 wireless network.

12. The method of claim 8, wherein the second network is a BLUETOOTH wireless network.

13. The method of claim 8, wherein the first network is a cellular wireless network.

14. The method of claim 8, wherein the transcript is presented in substantially real time with output of the audio data.

15. A computer-implemented method to provide transcriptions of an audio communication session, the method comprising:

receiving audio data at a first device that is generated by a remote device;

providing, from the first device, the audio data to a second device over a first network;

transmitting, to a transcription system from the second device, the audio data over a second network, the second network is a different type of network than the first network and the transcription system is configured to generate a transcript of the audio data;

obtaining, at the second device from the transcription system by way of the second network, the transcript of the audio data;

providing the transcript to the first device from the second device by way of the first network; and presenting the transcript by the first device.

16. The method of claim 15, further comprising:

multiplexing the audio data to generate first multiplexed audio data and second multiplexed audio data; and providing the first multiplexed audio data to a speaker for output of the first multiplexed audio data.

17. The method of claim 15, wherein the audio data is received at the first device over a third network.

18. The method of claim 17, wherein the third network is a different type of network than the first network and the second network.

19. The method of claim 17, wherein the second network and the third network are both cellular wireless networks.

20. The method of claim 15, wherein the first network is a IEEE 802.11 wireless network or a BLUETOOTH wireless network.

* * * * *